(12) United States Patent
Frank et al.

(10) Patent No.: US 7,401,825 B2
(45) Date of Patent: Jul. 22, 2008

(54) BUMPER WITH ATTACHMENT MEANS

(75) Inventors: Simon Frank, Tengen (DE); Thomas Rebstock, Hilzingen (DE)

(73) Assignee: Alcan Technology & Management Ltd., Neuhausen (CH)

( * ) Notice: Subject to any disclaimer, the term of this patent is extended or adjusted under 35 U.S.C. 154(b) by 49 days.

(21) Appl. No.: 11/412,440

(22) Filed: Apr. 27, 2006

(65) Prior Publication Data

US 2006/0244274 A1 Nov. 2, 2006

(30) Foreign Application Priority Data

Apr. 27, 2005 (DE) .................. 20 2005 006 731 U
May 24, 2005 (DE) .................. 20 2005 008 321 U (51) Int. Cl.
*B60R 19/34* (2006.01)

(52) U.S. Cl. ...................... 293/155; 293/133
(58) Field of Classification Search ................ 293/133, 293/155
See application file for complete search history.

(56) References Cited

U.S. PATENT DOCUMENTS

| 4,563,028 | A | 1/1986 | Ogawa et al. ............. 293/122 |
| 4,974,891 | A | 12/1990 | Furuta |
| 5,080,410 | A | 1/1992 | Stewart et al. ............ 293/102 |
| 5,584,518 | A | 12/1996 | Frank et al. ............. 293/155 |
| 5,727,827 | A | 3/1998 | Shibuya et al. |
| 6,270,131 | B1 * | 8/2001 | Martinez et al. ........... 293/132 |
| 6,293,587 | B1 * | 9/2001 | Lapic et al. .............. 280/784 |
| 6,371,541 | B1 | 4/2002 | Pedersen |
| 6,871,890 | B2 * | 3/2005 | Sato et al. ............. 293/155 |
| 6,918,621 | B2 * | 7/2005 | Seksaria ............... 293/133 |
| 2003/0218343 | A1 | 11/2003 | Sato et al. |
| 2004/0232711 | A1 | 11/2004 | Frank |

FOREIGN PATENT DOCUMENTS

| DE | 298 23 973 U 1 | 4/2000 |
| DE | 102 26 527 | 2/2004 |
| EP | 0 718 158 A1 | 6/1996 |
| EP | 0894675 | 2/1999 |
| GB | 261 213 | 11/1926 |
| JP | 61 143241 | 6/1986 |

* cited by examiner

*Primary Examiner*—Dennis H Pedder
(74) *Attorney, Agent, or Firm*—Klaus P. Stoffel; Wolff & Samson PC (57) ABSTRACT

A bumper with an attachment member to be made thereon for the purpose of mounting the bumper onto longitudinal beams of a vehicle, is such that section walls acting as compressive and tensile struts and a pair of flanking walls joining them form a hollow section. The attachment member is in the form of a hollow section exhibiting at least one side wall and two transverse walls following on therefrom with a length of hollow section with the longitudinal beam. The hollow section is in the form of a push-fit length matching the inner cross-section of the longitudinal beam. The other end region of the attachment member is provided with collar-type parts projecting from their end edges and aligned approximately parallel to the transverse walls. In a use position, the collar-type parts of the attachment member are aligned with the flanking walls of the bumper and are releasably attached to it. The bumper is bolted to the collar-type parts of the attachment member.

35 Claims, 6 Drawing Sheets

BUMPER WITH ATTACHMENT MEANS

BACKGROUND OF THE INVENTION

The invention relates to a bumper with attachment means to be made thereon for the purpose of mounting the bumper onto longitudinal beams of a vehicle, whereby the bumper is such that profiled section walls along with a pair of flanking walls form a hollow section, the section walls of the bumper being spaced apart forming compressive and tensile struts. The attachment means is in the form of a hollow section exhibiting at least one side wall and two transverse walls following on therefrom with a length of hollow support section for attachment to the longitudinal beam. Thereby, the hollow section of the bumper may, if desired at least in the region of the attachment means, be designed such that it is curved i.e. with respect to a transverse plane of the longitudinal axis of the vehicle.

A bumper with plate-shaped attachments running transverse to the longitudinal axis of its longitudinal beam is described in EP 0 718 158 B1, pointing out that apart from the cross-sectional shape of the bumper also the design of the connection to the longitudinal beams of the vehicle influences the stability of shape and the capacity to absorb energy of deformation due to impact.

A variety of attachment means is known for mounting the bumper onto the vehicle—for example from U.S. Pat. No. 5,080,410 or U.S. Pat. No. 4,563,028—these are, however, hardly able to contribute towards improving the shape-stability of a bumper.

EP 0 894 675 A1 described a bumper arrangement in which the mounting elements of the bumper broaden conically outwards causing their outer walls to lie intimately against the bumper or to converge with it.

Proposed in DE 298 23 973 U1 are particularly light bumpers which are reinforced with an additional section in load-bearing areas subjected to high loads. Thereby, the reinforcing section may also be a part of a facility for mounting the bumper. In that case the side-walls of the mouting facility expand conically outwards and come into position with the parts of the bumper section.

SUMMARY OF THE INVENTION

In view of the above, the object of the present invention is to provide a bumper of the kind mentioned at the start which exhibits a low weight and a high degree of shape-stability and, at the same time, adequate capacity for absorbing the energy of deformation on impact i.e. creating an efficient energy absorption element. Further, the manufacture and handling of the bumper and the attachment means should be very simple and the longitudinal beam forces should be lower and central.

The length of hollow support section according to the invention is in the form of a hollow section attachment means with a push-fit length that fits into the inner cross-section of the longitudinal beam. The other end region of the attachment means is provided with collar-like parts that project out from its edges at the end and lie approximately parallel to the transverse walls of the hollow section. In the functioning position, these collar-like parts of the attachment means are aligned with the flanking walls of the bumper and are releasably attached to them, preferably screwed on to them.

At the other end, the attachment means is likewise releasably secured in the longitudinal beam—preferably by screws—thus forming an efficient energy-absorbing element.

This energy-absorbing element can be manufactured in the form of a single chamber section, but is however preferably made in the form of a multi-chamber section. The attachment means should then contain several chambers running parallel to the middle line, which are delimited by both side walls and by the inner plates extending between them. Also it has been found useful to have in the push-fit length a central chamber which is delimited by two outer chambers of smaller volume next to the transverse plates.

According to a further feature of the invention a longitudinal strip is formed in the side wall of the attachment means at about mid-height—matching the shape of the longitudinal beam—with a breadth that is preferably approximately one third to half the height of the attachment means.

The longitudinal strip is delimited on both sides by a recess line, which is inclined outwards and upwards and joins up with the plane of the edge strips of the side wall on both sides; the side wall offers therefore a stepped profile comprising three strip-shaped regions. Further, there should be an inner plate extending between both side walls inside the attachment means section on both sides of the longitudinal strip or from the edge strips next to the recess strips. The inner plates usefully run within two planes defined by the collar-like parts. These collar-like parts should be formed by tongue-like lengths that are—as viewed in longitudinal cross-section—curved parts of the transverse plates of the push-fit lengths and should feature holes that accommodate bolts.

In another version of the collar-like parts, these are channel-shaped parts with upper edges of flanking walls that face away from the middle line of the attachment means; these preferably run into the plane of a side wall, in particular their edge strips. The base of this channel-shaped collar part runs, approximately axially, a distance from its end into a plane that is upwardly inclined and joins up with the transverse plate at the other end.

It has been found favorable to make both the channel base and the flanking walls double-walled; the channel base should contain lengths of a transverse plate and inner plate that lie one on top of the other, the flanking walls—likewise one on top of the other—preferably contain lengths of the side wall or an edge strip in question.

According to a further feature of the invention, the end edge of the longitudinal strip projecting axially from both channel-shaped parts of the attachment means is provided on both sides of the middle line with a collar strip which ensures the sideways positioning thereof. This collar strip is arranged at the free end of the longitudinal strip.

According to another feature of the invention, a transverse axis, which defines the position of the holes in the edge strips of the side walls, is situated a distance from the end edge of the push-fit length.

According to the invention, an insert element is provided in the outer chamber and features a tube-shaped channel which is to be aligned with the holes in the push-fit length or their transverse axes, said tube-shaped channel penetrating a block-like body which integrally joins up with a face of a base plate of an insert element. This is preferably inserted in a side chamber of the attachment means.

The base plate terminates at the edge remote from the block-shaped body with an edge channel, which delimits a slit with the surface of the base plate remote from block-shaped body. When the block-shaped body is in the installed position, the edge channel accommodates the abutting inner plate. It has also been found favorable that when the block-shaped body is in the installed position, its end face makes contact with the outer face of a channel-shaped transverse depression on the outside, shape-formed into the transverse plate.

The attachment means is—as previously mentioned—preferably bolted to the longitudinal beam. For example, the end edge may be inclined at an angle to the middle line of the attachment means and then fixed there by three stud bolts. However, the longitudinal beam may also be attached by means of two or four stud bolts running transverse to the middle line, and the bolts penetrate the section walls of the longitudinal beam and the attachment means.

It is clear that the attachment means is designed as a straight energy-absorbing element and at the end with both collar-shaped parts fitted over or under the upper and the under flanking walls of the bumper. To that end recesses forming a U-shaped end section are provided in the side walls of the energy-absorbing element.

At least one of the section walls—preferably however all section walls—of the energy-absorbing element lies against the inner side of the longitudinal beam walls. This allows a push-fit mechanical attachment in the longitudinal beam.

The cross-section of the energy-absorbing element and the longitudinal beam may—as described above—contain grooves or depressions or the like longitudinal strips for aligning or guiding and fixing the energy-absorbing element when it is pushed into the longitudinal beam. In an end part, at the head of its end length, the energy-absorbing section features a U-shape; its vertical section walls are removed in the end length of the section with the result that the upper and lower side walls of the energy-absorbing element project out beyond the ends of the vertical walls. The upper and lower section wall of the attachment means is—as mentioned—pushed over the upper and lower section walls of the bumper, whereby the end face of the vertical walls of the energy-absorbing element are situated next to the tensile strut of the bumper. The upper and lower walls of the energy-absorbing element projecting over the bumper section walls are attached to the bumper, or upper and lower section walls thereof, by means of one or more bolted connections.

At the end of the attachment means facing the bumper, the vertical walls of the energy-absorbing element may be removed between the two inner plates. In the end section length, the upper section wall rests against the upper end plate—forming an open U-shaped channel there. The lower section wall in that section end length rests against the lower inner plate—forming a U-shaped channel there. The upper and lower section walls are folded inwards towards the hollow chamber and both form, together with the vertical section walls in the region of the inner plates and with the inner plates, a double-walled length of section. The channel-shaped cross-sections overlap the bumper and are bolted to it. The inwards folding of the upper and lower section walls at the front end section may take place by squeezing, roll-forming, stamping or the like.

Further advantages, features and details of the invention are revealed in the following description of preferred exemplified embodiments and with the aid of the drawings.

BRIEF DESCRIPTION OF THE DRAWINGS

FIGS. 13-14, 16: in each case a part of a sectioned longitudinal beam with attachment means inserted in it.

DETAILED DESCRIPTION OF THE INVENTION

Figure 1:
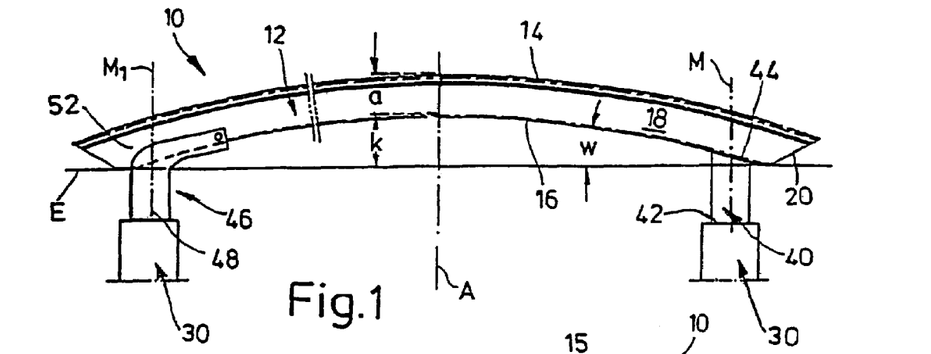
FIG. 1: is a plan view of a bumper with attachment means—different versions at either end of the bumper—for mounting onto a longitudinal beam.

A bumper 10 made from an extruded aluminium alloy—for a private car which for reasons of clarity is not shown here—features, as shown in FIG. 1, a box-shaped hollow section 12 with two section walls 14, 16 that are spaced a distance apart and are joined by transverse or flanking walls 18. The hollow section 12 is aligned to a transverse plane E running at a right angle to the longitudinal axis A of a vehicle, and curved with respect to that transverse plane E, equally and symmetrically on both sides of the vehicle longitudinal axis A. A distance k from the plane E to the interception of the longitudinal axis A with the hollow section 12 defines the extent of curvature. When installed, the outer section wall 14 facing away from the transverse plane E forms an outer or compression strut which receives the forces of impact, while the inner section wall 16 forms an inner or tensile strut.

The bumper 10 is aligned with longitudinal beams 30 of a vehicle, which run parallel to the longitudinal axis A of the vehicle. They are made up of two parallel side walls 34 and transverse walls 36 joining them, which define an interior 32 of the longitudinal beams 30.

Indicated in FIG. 1 close to the right end edge 20 of the hollow section 12 is a tube-like deformation facility 40 comprising a section piece which makes contact with the inner section wall 16 at one end and, at the other end is aligned with a push-fit length 42 of the longitudinal beam 30. The deformation facility 40 is likewise made from an extruded light weight aluminium alloy and, at the end abutting the bumper 10, is cut at an angle. The resultant inclined end 44 of the section piece defines the angle w of e.g. 10° the bumper 10 makes with the transverse plane E.

Figure 2:
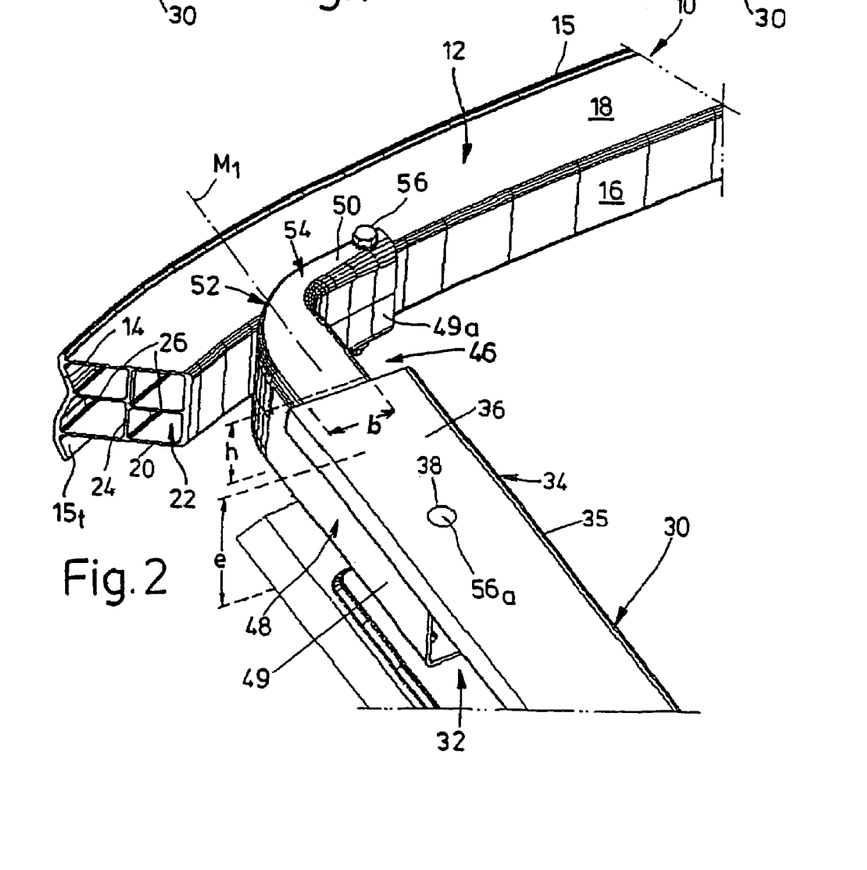
FIG. 2: is a perspective view of a part of the bumper with the attachment means shown in FIG. 1.

Another mode of connection of the hollow section 12 to the longitudinal beam 30 is sketched out in FIG. 1 at the left end of the bumper 10 and shown in greater detail in FIG. 2. Here it is clear that the section wall 14—serving as outer strut and wave-shaped in cross-section—exhibits wing-shaped wall parts in the form of edge strips 15, $15_t$ that project out beyond the transverse or flanking walls 18. Also to be seen in FIG. 2 is that an edge strip 35 on the side wall 34 of the longitudinal beam 30 likewise extends beyond the outer face of the transverse wall 36. The second side wall 34 is for reason of clarity not shown here.

Provided in the interior 22 of the hollow section 12 is an integral transverse wall 24 running parallel to the section walls 14, 16, joining the flanking walls 18 and featuring middle walls 26 joining up with the section walls 14, 16. These middle walls 26 are offset with respect to each other.

In this case the connection between the hollow section 12 and the longitudinal beam 30 is made via a mounting bracket 46 in the form of a hollow extruded aluminium alloy section of breadth b e.g. of 55 mm and height h 75 mm. A push-fit length 48, which is approximately rectangular in cross-section—featuring two parallel side walls 49, $49_a$ with transverse side walls 50 of the hollow section of the bracket 46 joining them—is aligned with the longitudinal beam 30 of height e and screwed into place there. The push-fit length 48 also features a curved length 52. The right hand side wall 49$_a$ is curved out from the longitudinal axis $M_1$, i.e. in FIG. 2 towards the right, and the other side wall 49 is curved towards its end such that at the end both side walls 49, 49$_a$ lie against each other and each of the transverse walls 50 is folded approximately in the middle. Thereby, the inner curvature runs the same as the outer face of the inner section wall 16 of the hollow section 12, i.e. they run together on a parallel at the above mentioned angle w to the transverse plane E.

The double layered flanges 54 of the resultant channel-like curved length 52 are penetrated in the region of holes—not shown in the drawing—by screws 56 or like connecting means which also engage in holes in the flanking walls 18 of the bumper. Corresponding holes for connecting means 56$_a$ are provided in the push-fit length 48 of the mounting bracket 46. These connecting means 56$_a$ are situated in openings 38 in the longitudinal beam 30.

Figure 3:
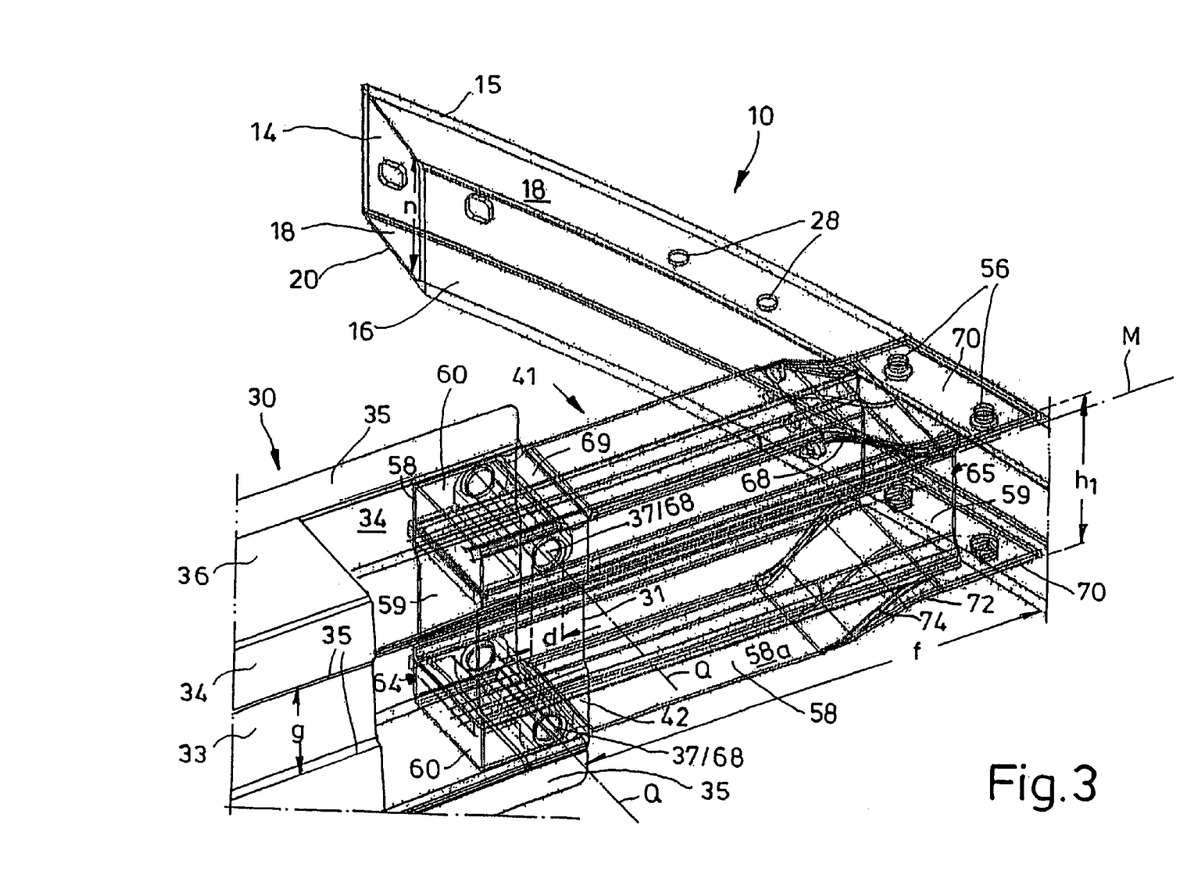
FIG. 3: is a perspective view of another bumper with a profiled element as the attachment means inserted in the longitudinal beam.

FIG. 3 shows a bumper 10 with the above mentioned holes 28 in its flanking walls 18. Also to be seen here is the end region of a longitudinal beam 30 a distance f from the bumper 10. Shape-formed into both side walls 34, at about mid-height, are longitudinal strips 33 delimited by recess lines 35. The breadth g of the longitudinal strips 33 is equal to about half the section height e.

Inserted into the free end of the longitudinal beam 30 is a length of hollow section in the form of a push-fit length 42 of a deformation facility or section element 41, the approx. rectangular cross-section of which is defined by side walls 58 and transverse walls 60. Each side wall 58—corresponding to the shape of the side wall 34 of the longitudinal beam 30—contains at about mid-height a shape-formed longitudinal strips 59 of depth q. The longitudinal edges of each of the longitudinal strips 59 are formed by recess lines 57 which are curved outwards—upwards—and continue into a strip 58a of the side wall 58. In section element 41, parallel to transverse walls 60 and running a short distance from both recess lines 57 in the side wall 58, are inner plates 62, the transverse edges 63 of which form transverse lines in the end edge 64 of section element 41 and delimit two side chambers 67 on either side of a central chamber 66 in the middle of the section element 41.

Provided on both sides of the integral longitudinal strip 59, in the side wall 58 is a hole 68 of diameter d for insertion of a connecting pin which penetrates both the longitudinal beam and the section element 41. Correspondingly, holes 37 are provided in the side walls 34 of the longitudinal beam 30.

Figures 4, 5:
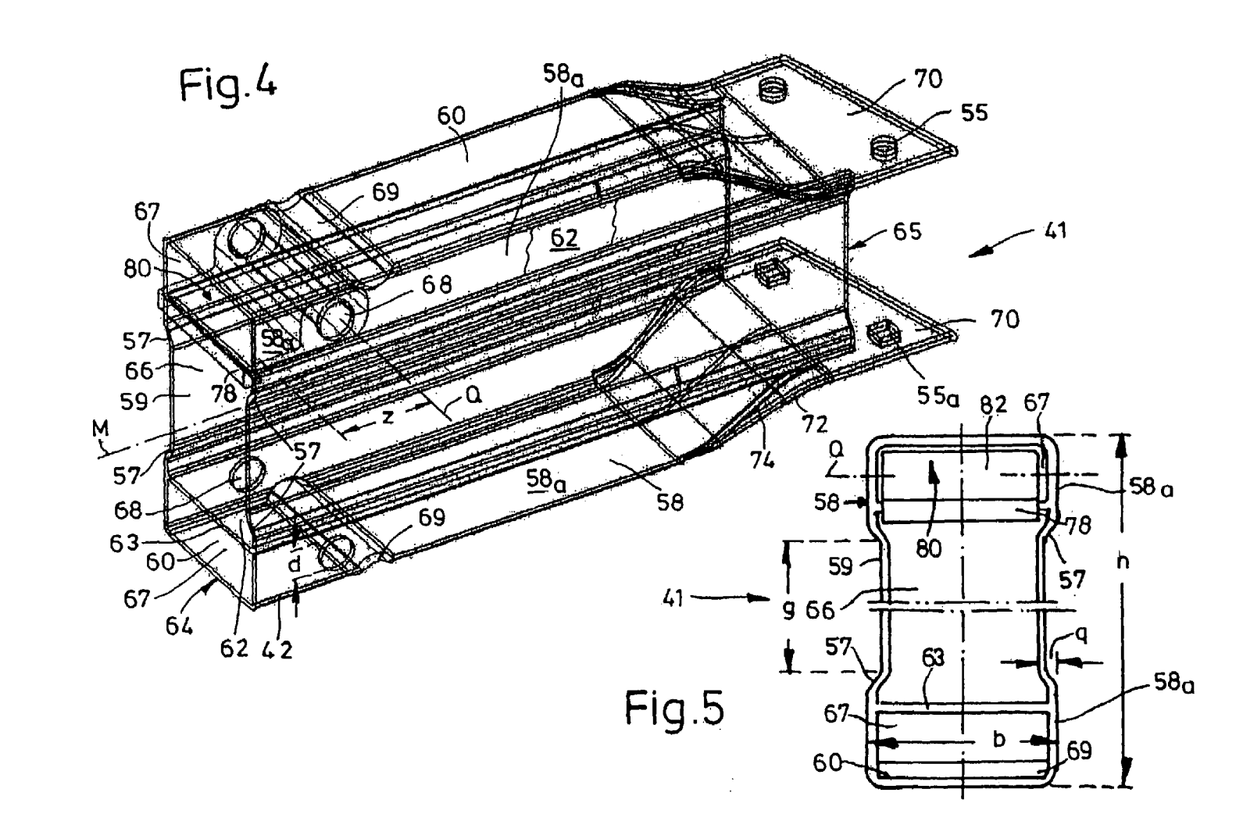
FIG. 4: is an enlarged perspective view of the profiled element shown in FIG. 3.
FIG. 5: is an end view of the profiled element shown reduced in size.

Shown in FIG. 3, close to the end edge 31 of the longitudinal beam 30 in each of the transverse walls 60 of the section element 41, is a transverse depression 69 which is approximately semi-circular in cross-section and runs parallel to an axis Q of one of the holes 37, 68. The distance z of the axis Q from the end edge 64 of the section element 41 is indicated in FIG. 4.

The end height $h_1$ of the end of section element 41 facing the bumper 10 matches the free inner height n of the bumper 10. The end height $h_1$ is defined by the outer faces of a pair of collar-shaped plates 70 as end regions of the transverse walls or plates 60, which project beyond end area 65 of the section element 41—running to the right in FIG. 3, 4—and are mated with the transverse plate 60 in question by means of a curved tongue-shaped length 72, as viewed in the longitudinal cross-section. Also as viewed in longitudinal cross-section it can be seen that lengths 74 of the transverse plate 60 are bent towards the middle axis m of the section element 41. These lie against the outer face of the neighboring inner plate 62. The insides of both collar-shaped plates 70 fit by virtue of shape onto the transverse walls 18 of the bumper 10 and are joined to them by means of screws 56, which pass through holes 55, 55$_a$.

Figures 6, 7, 8, 9, 10:
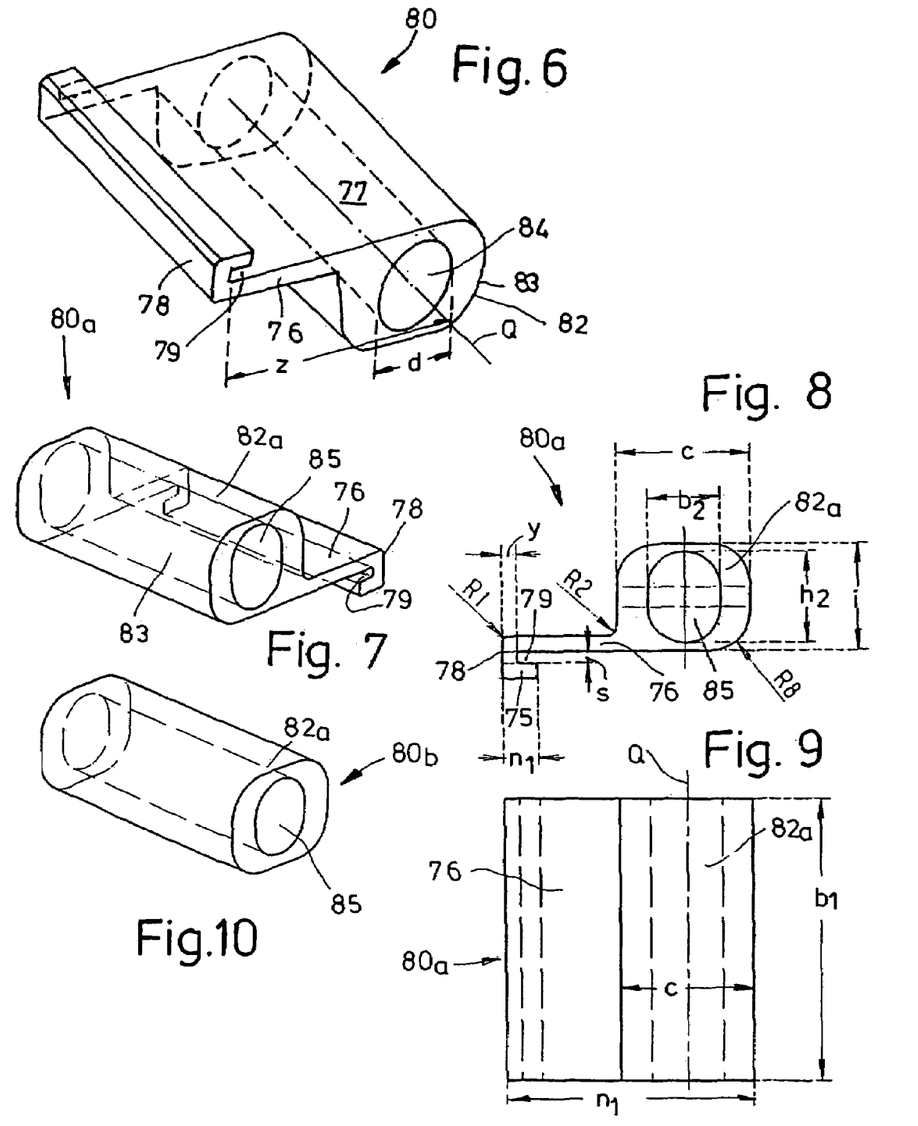
FIG. 6: is an enlarged detail from FIG. 4.
FIGS. 7, 10: show two other versions of the detail shown in FIG. 6.
FIGS. 8, 9: are a front view and plan view, respectively, of the detail shown in FIG. 7.

Inserted between the above mentioned inner plate 62 and the neighboring transverse wall 60 of the section element 41, in a side chamber 67, is a special insert element 80 which is sketched in detail in FIG. 6. When installed in place, the base plate 76 of the insert 80 lies against the inner plate 62 of the section element 41. The base plate 76—an integral part of a block-shaped body 82—projects out tangentially from that block 82. A tube-shaped channel 84 of diameter d, which corresponds to that of the holes 37, 68, is centered along the transverse axis Q, when an edge channel 78 in the base plate 76 engages the end edge 63 of the inner plate 62 making contact with this surface 77, by means of a slit 79 which is delimited on one side by, and parallel to, the surface 77. The—in FIG. 6 right—partially circular-shaped, curved end face 83 of the block-shaped or tube-like body 82 lies against the outer face of the channel-shaped depression 69 in the neighboring transverse plate 60.

Another version of an insert element 80$_a$ as shown in FIG. 7-9 contains a channel 85 which is oval in cross-section of breadth $b_2$ of 14 mm and height $h_2$ of 18 mm in the tube-like body 82$_a$ of breadth c of 26 mm and height i of 21 mm. The thickness y of the base plate 76 is in this case 3 mm, while the height s of the slit 79 at the edge channel 78 is 2.2 mm; its shorter flange 75 has a length $y_1$ of 7 mm and an overall length $n_1$ of the insert element 80$_a$ of approx. 49 mm and breadth $b_1$ of approx. 55 mm.

The insert 80$_b$ shown in FIG. 10 comprises a tube-like body 82$_a$ with the specific dimensions of that in FIG. 8, i.e. it has no base plate.

Figure 11:
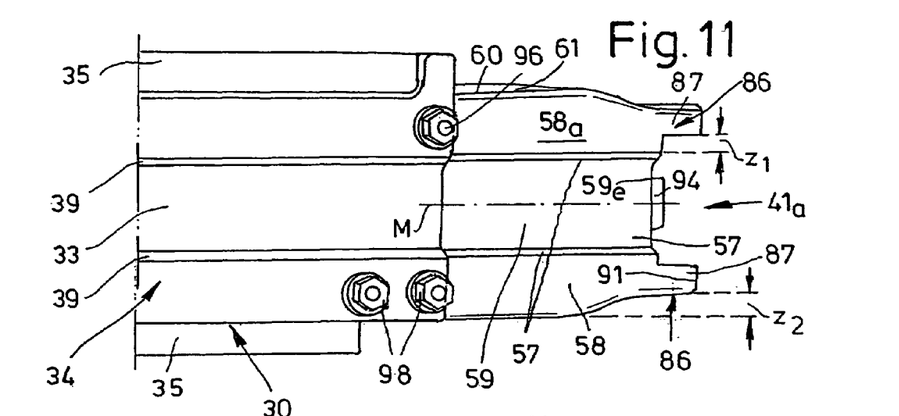
FIGS. 11, 12, 15: are perspective views of a part of a longitudinal beam with attachment means secured in place.
Figure 12:
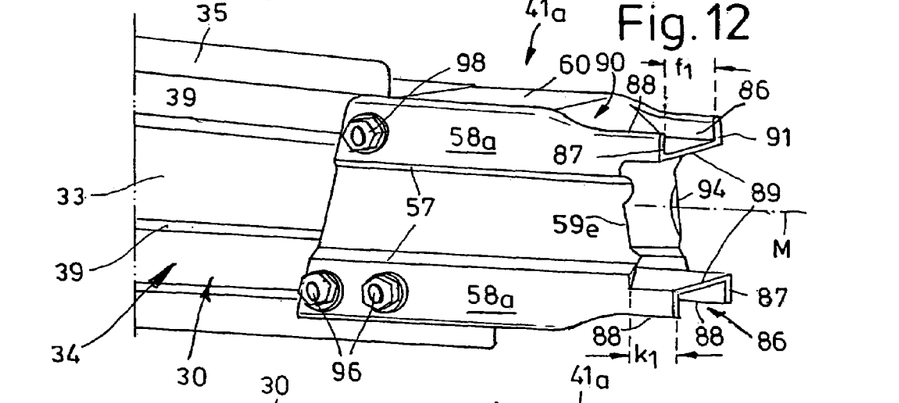
Figure 13:
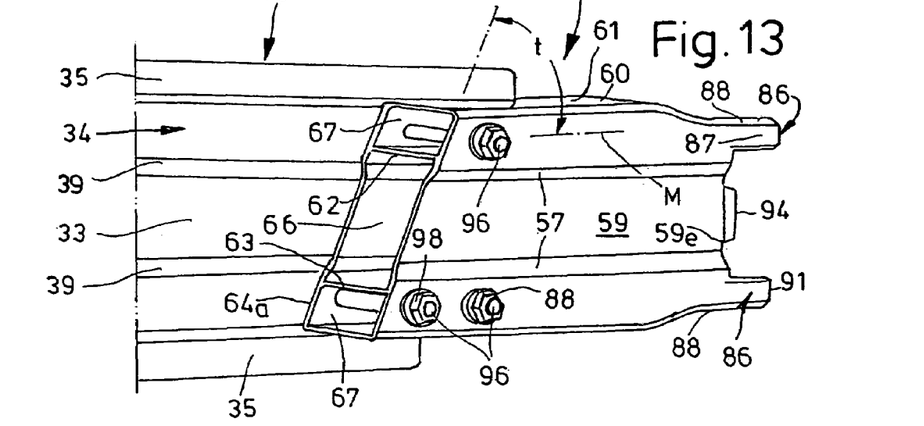

FIGS. 11 to 13 show a section element 41$_a$ with an end edge 64$_a$ inclined at an angle t of about 70° to the middle line M. This is secured in place by three stud bolts 96 with nuts 98 at the ends. At the free ends project two integral channel-shaped parts 86 which are screwed onto the bumper 10. Both flanking walls 87 of channel-shaped parts 86 of collar length $k_1$ run into the plane of the edge strips 58$_a$ a distance $z_1$ from the recess lines 57, the upper edges 88 of which are a distance $z_2$ from the surface 61 of the trans-verse plate or transverse wall 60. These flanking walls 87 are shape-formed towards the middle line M on a channel base 89, which joins up at the rear plane 90 with the transverse plate 60; this can be seen particularly well in FIG. 12, 15. The sloping plane 90 begins a distance $f_1$ from the end 91 of the channel 86. Also, an integral narrow collar strip 94 is provided at the free end edge 59$_e$ of each longitudinal strip 59.

Figures 15, 17:
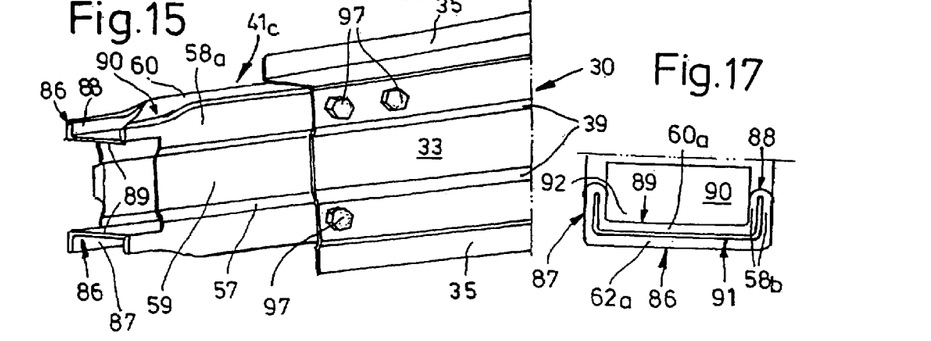
FIG. 17: is an enlarged front view of a channel-shaped part of the attachment means, indicated in FIGS. 11 to 15.
Figure 16:
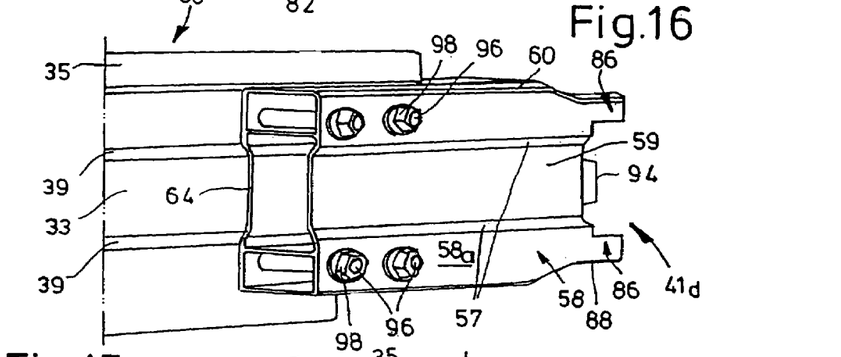

In particular in FIG. 17 it can be seen that the internal channel part 86 has a double wall—as seen in cross-section. The channel base 89 is formed towards the interior 92 by a shape-formed length 60$_a$ of the transverse plate 60, which lies on a length 62$_a$ of the inner plate 62. Both flanking walls 87 bordering the channel base 89 are formed by two layers of a length 58$_b$ of the edge strip 58.

Figure 14:
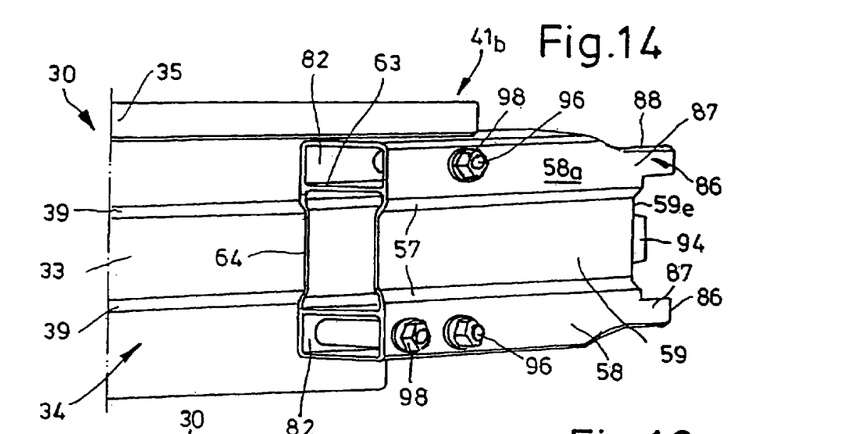

The section elements 41$_b$, 41$_c$ in FIGS. 14, 15 are secured—with end edge 64 perpendicular to the longitudinal axis or middle line M—by three stud bolts 96, and the section element 41$_d$ in FIG. 12 with four stud bolts 96.

The bolted connection formed by the stud bolts 96 penetrates preferably the entire section cross-section and is such that the head 97 of the bolt—with or without washer—makes contact with a first section wall 34 and its nut 98—with or without washer—makes contact with one of the first, essentially opposite second section wall 34 of the longitudinal beam 30.

Although the present invention has been described in relation to particular embodiments thereof, many other variations and modifications and other uses will become more apparent to those skilled in the art. It is preferred, thereof, that the present invention be limited not by the specific disclosure herein, but only by the appended claims.

The invention claimed is:

1. A bumper, comprising:
   a pair of spaced apart section walls that act as compressive and tensile struts, and a pair of flanking walls that join together the section walls to form a main hollow section member; and
   attachment means for mounting the main hollow section member onto longitudinal beams of a vehicle, the attachment means having at least one side wall and two transverse walls that form an attachment hollow section beam having, at a first end, a push fit length that extends in a longitudinal direction and matches an inner cross-section of the longitudinal beams, and a second end with collar parts that project from end edges of the hollow section beam and are aligned substantially parallel to the transverse walls, wherein the attachment means includes two sidewalls and a plurality of chambers running parallel to a middle axis, which chambers are delimited by the side walls and inner plates extending between the side walls, wherein the collar parts are two channel-shaped lengths with upper edges pointing away from the middle axis of the attachment means and flanking walls delimiting a channel base.

2. The bumper according to claim 1, wherein, in a position of use, the collar parts of the attachment means overlap the flanking walls of the bumper and are releasably attached thereto.

3. The bumper according to claim 2, wherein the main hollow section member is bolted onto the collar parts of the attachment means.

4. The bumper according to claim 1, wherein the attachment means is insertable into the longitudinal beam as an energy-absorbing element and is releasably attachable thereto.

5. The bumper according to claim 1, wherein a middle chamber of the push-fit length is delimited by two outer chambers connecting up with the transverse walls.

6. The bumper according to claim 5, wherein the side wall of the attachment means has an integral longitudinal strip formed into it at about mid-height, the strip having a breadth that corresponds to substantially one third to one half of a height of the attachment means.

7. A bumper, comprising:
   a pair of spaced apart section walls that act as compressive and tensile struts, and a pair of flanking walls that join together the section walls to form a main hollow section member; and
   attachment means for mounting the main hollow section member onto longitudinal beams of a vehicle, the attachment means having at least one side wall and two transverse walls that form an attachment hollow section beam having, at a first end, a push fit length that extends in a longitudinal direction and matches an inner cross-section of the longitudinal beams, and a second end with collar parts that project from end edges of the hollow section beam and are aligned substantially parallel to the transverse walls, wherein the attachment means includes two side walls and a plurality of chambers running parallel to a middle axis, which chambers are delimited by the side walls and inner plates extending between the side walls, wherein a middle chamber of the push-fit length is delimited by two outer chambers connecting up with the transverse walls, wherein the side wall of the attachment means has an integral longitudinal strip formed into it at about mid-height, the strip having a breadth that corresponds to substantially one third to one half of a height of the attachment means, wherein the longitudinal strip is delimited on both sides by a recess line that is inclined from the longitudinal strip outwards and upwards and is formed on both sides to meet edge strips in a plane of the side wall.

8. The bumper according to claim 7, wherein one of the inner plates extends between both side walls on both sides of the longitudinal strip or its recess lines.

9. The bumper according to claim 7, wherein each inner plate runs between a pair of planes defined by the collar parts, the collar parts being formed as plates.

10. The bumper according to claim 8, wherein the inner plate runs between a pair of planes defined by the collar parts, the collar parts being formed as plates.

11. The bumper according to claim 9, wherein the collar part is formed on a curved tongue-like length of one of transverse walls of the push-fit length of section.

12. The bumper according to claim 10, wherein the collar part is formed on a curved tongue-like length of one of the transverse walls of the push-fit length of section.

13. The bumper according to claim 7, wherein the collar parts are two channel-shaped lengths with upper edges pointing away from the middle axis of the attachments means and flanking walls delimiting a channel base, wherein the flanking wall runs approximately in the plane of the edge strip of the side wall.

14. The bumper according to claim 1, wherein, at a distance (f) from an end of the channel, the channel base of the channel-shaped collar part has an upwards inclination which joins up with the transverse wall.

15. The bumper according to claim 1, wherein both the channel base and the flanking walls are double layered.

16. The bumper according to claim 15, wherein the channel base includes lengths of the transverse wall the inner plate lying on top of each other.

17. The bumper according to claim 1, wherein each flanking wall includes overlapping lengths of the side wall of the attachment means.

18. The bumper according to claim 1, wherein both end edges of the longitudinal strip, beyond which both channel-shaped collars of the attachment means project axially on both sides of the middle axis, are provided with a collar strip.

19. The bumper according to claim 18, wherein the collar strip is formed on a free end of the longitudinal strip.

20. The bumper according to claim 3, wherein the collar part has bolt holes.

21. The bumper according to claim 11, wherein the collar plate has bolt holes.

22. The bumper according to claim 1, wherein the channel-shaped part has bolt holes.

23. The bumper according to claim 8, wherein a transverse axis (Q) runs a distance (z) from an end edge of the push-fit length and defines a position of holes in the edge strips of the side wall.

24. The bumper according to claim 23, wherein the distance (z) corresponds at most to the breadth (b) of the push-fit length.

25. The bumper according to claim 23, and further comprising an insert element introduced into the outer chamber, said insert element having a tube-shaped channel which is aligned with a hole in the push-fit length or the transverse axis (Q).

26. The bumper according to claim 25, wherein the insert element includes a block-shaped body through which the tube-shaped channel passes, the block-shaped body being formed on an area of a base plate of the insert element.

27. The bumper according to claim 26, wherein the base plate terminates at an edge channel that forms a slit together with a surface of the base plate remote from the block-shaped body.

28. The bumper according to claim 27, wherein, in an installed position of the block-shaped body, the edge channel accommodates a transverse edge of the neighboring inner plate.

29. The bumper according to claim 25, wherein the insert element is inserted into the outer chamber.

30. The bumper according to claim 5, wherein an insert element is inserted into the outer chamber.

31. Bumper according to claim 29, wherein the insert element has a height that corresponds substantially to a height of the outer chamber.

32. The bumper according to claim 26, wherein, when the block-shaped body is in the installed position, an end face of the block-shaped body makes contact on an outer side with a channel-like transverse depression formed in the transverse plate.

33. The bumper according to claim 1, wherein the push-fit length has an end edge that is inclined at an angle to a the middle line of the attachment means.

34. The bumper according to claim 1, wherein the push-fit length is attachable to the longitudinal beam by at least two stud bolts.

35. The bumper according to claim 33, wherein the push-fit length is attachable to the longitudinal beam by three stud bolts.

* * * * *

UNITED STATES PATENT AND TRADEMARK OFFICE
CERTIFICATE OF CORRECTION

PATENT NO.         : 7,401,825 B2                                    Page 1 of 1
APPLICATION NO.    : 11/412440
DATED              : July 22, 2008
INVENTOR(S)        : Simon Frank et al.

It is certified that error appears in the above-identified patent and that said Letters Patent is hereby corrected as shown below:

On the title page, item 75, should read

Inventors: Simon FRANK, Tengen (DE); Thomas REBSTOCK, Hilzingen (DE); Bernd ARTNER, Renningen (DE); Patrick MAIER Rottenburg (DE)

Signed and Sealed this
First Day of March, 2016

Michelle K. Lee
*Director of the United States Patent and Trademark Office*